United States Patent [19]

Reusser et al.

[11] 3,915,897

[45] Oct. 28, 1975

[54] OLEFIN DISPROPORTIONATION CATALYST

[75] Inventors: Robert E. Reusser; Stanley D. Turk, both of Bartlesville, Okla.

[73] Assignee: Phillips Petroleum Company, Bartlesville, Okla.

[22] Filed: Oct. 26, 1973

[21] Appl. No.: 410,269

Related U.S. Application Data

[62] Division of Ser. No. 176,260, Aug. 30, 1971, Pat. No. 3,786,112.

[52] U.S. Cl. ................ 252/457; 252/437; 252/441; 252/443; 252/455 R; 252/463; 252/465; 252/475

[51] Int. Cl.² .......................................... B01J 21/10

[58] Field of Search ..... 260/683 D, 683.2; 252/437, 252/441, 443, 455 R, 457, 458, 460, 465, 463, 464, 475

[56] References Cited
UNITED STATES PATENTS

| | | | |
|---|---|---|---|
| 3,204,009 | 8/1965 | Keith | 260/683.2 |
| 3,261,879 | 7/1966 | Banks | 260/683.2 X |
| 3,365,513 | 1/1968 | Heckelsberg | 260/683 D |
| 3,600,456 | 8/1971 | Bradshaw | 260/683 D |
| 3,658,929 | 4/1972 | Banks | 260/683.2 X |

FOREIGN PATENTS OR APPLICATIONS

| | | | |
|---|---|---|---|
| 1,054,864 | 1/1967 | United Kingdom | 252/463 |
| 1,205,677 | 9/1970 | United Kingdom | 260/683 D |

Primary Examiner—Patrick P. Garvin

[57] ABSTRACT

A catalyst for the olefin disproportionation of unsaturated hydrocarbons is provided comprising a physical mixture of a solid disproportionation catalyst and a double bond isomerization catalyst wherein the double bond isomerization catalyst is further treated with a base.

9 Claims, No Drawings

OLEFIN DISPROPORTIONATION CATALYST

This application is a division of our copending application Ser. No. 176,260 filed Aug. 30, 1971, now U.S. Pat. No. 3,786,112.

BACKGROUND OF THE INVENTION

1. Field of Invention

This invention relates to a catalyst composition useful in the conversion of unsaturated hydrocarbons in accordance with the olefin reaction.

2. Description of the Prior Art

The art has recently reported numerous catalytic materials which effect the olefin disproportionation reaction of unsaturated hydrocarbons. The olefin reaction can be visualized as the breaking of two existing double bonds between first and second carbon atoms, and between third and fourth carbon atoms, respectively, and the formation of two new double bonds, such as between the first and third carbon atoms and the second and fourth carbon atoms, respectively, wherein the new double bonds can be on the same or different molecules. The reaction can be visualized by using a mechanistic scheme involving a cyclobutane transition state wherein two pairs of carbon atoms each pair connected by a double bond combine to form a 4-center intermediate which then disassociates by breaking either set of opposing bonds. This reaction can be illustrated by the following formulas:

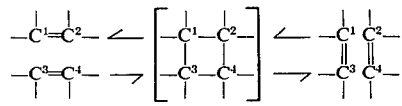

The above reaction has been described by various terms other than "olefin disproportionation". Among those terms utilized are "the olefin reaction," "olefin dismutation," "mutual cleavage," "transalkylidenation," and "olefin metathesis." Throughout this specification and claims, the term "olefin disproportionation" is used as a matter of choice and is deemed to be equivalent to the above-mentioned terms. In addition, it has recently been discovered that the disproportionation reaction can be applied to materials other than olefinically unsaturated hydrocarbons. Accordingly, it has been reported that acetylenically unsaturated hydrocarbons and olefinic materials which contain functional groups such as nitrile groups or fluoro groups also undergo this type of reaction.

Among the numerous catalyst systems which have been reported to effect the disproportionation reaction are those of U.S. Pat. No. 3,261,879, Banks (1966), and U.S. Pat. No. 3,365,513, Heckelsberg (1968). The Heckelsberg patent discloses that tungsten oxide on silica is a suitable disproportionation catalyst.

It has also been reported in the prior art that the presence of a catalyst which possesses double bond isomerization activity in a disproportionation reaction zone is advantageous in that it increases the rate of conversion and makes possible the production of a wider range of reaction products. For example, the presence of such double bond isomerization activity greatly increases the disproportionation rate of symmetrical olefins such as butene-2. In addition, the isomerization activity permits the exhaustive cleavage of high molecular weight monoolefins with ethylene to lower molecular weight monoolefins such as propylene and isobutene. British Pat. No. 1,205,677, published Sept. 16, 1970, provides a catalyst which comprises an olefin disproportionation component and a Group VIII noble metal double bond isomerization component, i.e., palladium, platinum, or ruthenium. Another catalyst system which accomplishes these results is obtained by physically mixing about 6 parts of catalytic magnesium oxide with about 1 part of tungsten oxide on silica catalyst. Other catalysts which have been developed include those obtained by copromoting an olefin disproportionation catalyst such as tungsten oxide on silica with minor amounts of the oxides of niobium, tantalum, or vanadium to provide the double bond isomerization activity.

In dealing with the olefin disproportionation reaction, those skilled in the prior art have recognized certain facts. First, generally all of the catalysts of the prior art possess some latent double bond isomerization activity. This activity can be desirable or undesirable depending upon the products desired from the olefin disproportionation reaction. Thus, where one wishes a selective reaction to a narrow range of products, the art has treated the solid catalysts of the prior art with alkaline earth and alkali metal ions to inhibit double bond isomerization activity. When the art has desired to broaden the distribution of product materials, it has admixed the disproportionation catalyst with a suitable double bond isomerization catalyst. Treatment of the catalyst with a base has also been advantageous in that it tends to inhibit the undesirable reactions of polymerization and oligomerization of branched unsaturated feed materials. However, obtaining high conversions of highly branched feed materials is very difficult even when these materials are employed in the so-called mutual cleavage reaction, e.g. the conversion of isobutene and butenes to provide isoamylenes.

OBJECTS OF THE INVENTION

It is an object of this invention to provide a new catalyst capable of promoting or catalyzing the above-described olefin reaction conversion of unsaturated hydrocarbons. It is a further object of the invention to provide a catalyst capable of increasing the conversion of highly branched unsaturated materials in accordance with the olefin reaction.

SUMMARY OF THE INVENTION

We have suprisingly discovered that a catalyst comprising a mixture of an olefin disproportionation catalyst and a double bond isomerization catalyst wherein the latter catalyst has been treated with an alkali metal or alkaline earth metal compound is capable of converting highly branched olefinic materials according to the olefin disproportionation reaction. Further, we have discovered that this catalyst is more active when converting unsaturated feed disproportionation materials in accordance with the olefin reaction than those catalysts of the prior art. Accordingly, the process of our invention comprises converting unsaturated feed materials according to the olefin disproportionation reaction by contacting the feed materials with our new catalyst.

DETAILED DESCRIPTION OF THE INVENTION

Our catalyst comprises a physical mixture of a solid olefin disproportionation catalyst and a solid double bond isomerization catalyst. It is essential that the catalysts be suitably mixed because tandem bed operation of the two catalytic entities does not provide the results achieved with the physical mixture.

The solid double bond isomerization catalysts which are suitable for use in our invention are any of those solid catalysts having the ability to isomerize butene-2 to butene-1 under the conditions at which the olefin disproportionation catalyst has activity for disproportionating butene-2 and ethylene to propylene. Those catalysts of the prior art which have been employed heretofore are suitable, such as Group VIII noble metals, i.e., palladium, platinum, or ruthenium; niobium, tantalum or vanadium oxides; and Group II and III metal oxides. Examples of suitable oxides of the Group II and III metals include magnesium oxide, calcium oxide, zinc oxide, gamma-alumina, bauxite, eta-alumina, barium oxide, strontium oxide and mixtures thereof. Preferably, the double bond isomerization catalyst is neutral or basic rather than acidic in its unactivated state. The pH of the above-mentioned catalysts is readily determined by providing an aqueous suspension of the catalyst and monitoring the pH by suitable means well known in the art. Therefore, of the above-mentioned catalysts, the Group II and III metal oxides are the most preferred; magnesium oxide being particularly preferred because of its high activity.

In accordance with our invention, the double bond isomerization catalyst is treated with alkali metal or alkaline earth metal compound prior to admixture with disproportionation catalyst. Suitable treating agents include the hydroxides, carbonates, the halides of the Group I metals or calcium hydroxide. Where a Group II metal oxide is employed as the double bond isomerization catalyst, it is preferred to use the Group I metal hydroxide compound as the treating agent. In particular, when magnesium oxide is used, the preferred treating agent is a compound of potassium. The hydroxide of potassium has been found to be particularly suitable.

The treatment of the isomerization catalyst with the base compound is simple and straightforward. An aqueous solution of the base compound is prepared containing sufficient base to provide from about 0.007 to 3.5, preferably 0.035 to 2.1 gram metal equivalents per 100 grams of the isomerization catalyst after treatment and drying. The method of determining the amount of base compound after incorporation into the catalyst is within the skill of those in the art. The isomerization catalyst is then placed in the aqueous treating solution for a period of time from a few seconds to sufficient time to allow the treatment to take effect. The length of time will vary depending upon the specific base compound and isomerization catalyst being employed. In the case of magnesium oxide treated with potassium hydroxide, a period of time of from about 5 to about 15 minutes is generally satisfactory.

When the preferred basic isomerization catalysts are employed, it is necessary to fix the treating compound to the catalyst surface. This is readily accomplished by removal of moisture under reduced pressure in a suitable apparatus well known to those in the art, such as a rotary evaporator. The tumbling mixture of treated catalyst and treatment solution can be subjected to mild heat treatment to aid in evaporation to dryness. Since the catalyst undergoes heat treatment in the course of activating it for use, it is not necessary to subject the catalyst to excessively severe water removal conditions at this stage. However, sufficient time is allowed to remove all visible amounts of water.

In view of the fact that activation of the base-treated isomerization catalyst is preferably conducted after it is admixed with the olefin disproportionation catalyst, it is best at this point to discuss the olefin disproportionation component of our new catalyst system.

Any catalyst system which is capable of promoting or catalyzing the olefin disproportionation reaction of butene-2 and ethylene to propylene is suitable for use in our combination catalyst. Many of these catalysts have been reported in the prior art. Preferably, the disproportionation catalyst is one of molybdenum, tungsten, or rhenium oxide deposited on a support of silica, alumina, silica-alumina or aluminum phosphate. The molybdenum oxide-promoted catalyst is disclosed in the Banks patent mentioned supra. The tungsten oxide-promoted catalyst is discussed in the Heckelsberg patent mentioned supra. The rhenium oxide-promoted catalyst is disclosed in British Pat. No. 1,054,864 (1967), Turner et al. The disclosures of these patents are incorporated by reference. These solid catalysts can also contain minor amounts of various treating agents, such as trialkylaluminum compounds, dialkylaluminum halides, mono- and polyvalent alcohols and the like.

The disproportionation catalyst can also be treated with the aforementioned base compounds and employed in combination with the isomerization catalyst. The treatment of these catalysts with alkaline earth and alkali metal compounds is accomplished in essentially the same manner as reported above for treating the olefin isomerization catalyst. However, since most of these catalyst supports are acidic, the water can be removed from the disproportionation catalyst particles by simple decantation or drainage with subsequent drying of the particles under mild heat conditions for a suitable period of time. This technique is well known in the art.

It is necessary that the catalyst system of the invention be activated for use in the conversion process. This is easily accomplished by contacting the physical mixture of the catalyst entities with an oxygen-containing gas at elevated temperatures. However, it will be understood by those skilled in the art that other activation methods can be employed, such as heating under a vacuum, or contact with admixtures of various elemental gases such as nitrogen or argon at high temperature. The temperature, contact time, and other conditions of activation treatment have been reported in the prior art and are, generally, the same conditions used to activate the disproportionation catalyst alone. Broadly, the activation conditions include a temperature of from about 750° to 1,800° F., or higher, for a time of 0.1 minute up to about 24 hours; shorter contact times being used where higher temperatures are employed to prevent excessive sintering of the catalysts.

The catalyst system of the invention is simply prepared by admixture of the base-treated double bond isomerization catalyst and the olefin disproportionation catalyst. To facilitate uniform mixing, it is desirable to have the individual catalysts in a form which is compatible one with the other. Thus, the catalysts can be in the form of powders, extrudates, prills, and the like prior to admixing the two catalysts together. The amount of base treated isomerization catalyst employed in the system is generally in excess of the amount of disproportionation catalyst used in the mixture on a parts by weight basis. Preferably, the amount of base-treated isomerization catalyst is at least 1.5 to about 10 parts by weight per part of olefin disproportionation catalyst. Excellent results have been obtained at levels of 6 parts of base-treated magnesium oxide per part of the silica supported tungsten oxide.

Although each separate component can be activated prior to admixture thereof, it is preferable to activate our catalyst system after the individual catalysts have been intimately admixed and placed in a suitable reactor. The heat treatment is preferably followed by contacting the system with an inert gas, such as nitrogen, to remove any air prior to contact with the unsaturated feed materials. In addition, it is also sometimes desirable to treat the catalyst system with a reducing gas, such as CO or $H_2$, prior to contact with the feed materials. For example, the base-treated magnesium oxide, tungsten oxide on silica $MgO/WO_3/SiO_2$ catalyst system can be contacted with CO at a temperature of from about 800° F. to 1400° F. for a period of time from about 1 minute to 30 hours subsequent to activation and the inert gas purge.

Our catalyst is active for the olefin disproportionation conversion of unsaturated materials in the same manner as those olefin disproportionation catalysts described in the prior art. Thus, the catalyst will convert acyclic and cyclic mono- and polyenes, including mixtures thereof, and mixtures thereof with ethylene to other unsaturated products. The conversions of olefinic materials which can be accomplished by our catalyst are summarized in U.S. Pat. No. 3,558,518, issued Jan. 26, 1971, at column 1, lines 27–66 and column 2, lines 1–44, the disclosure thereof being incorporated herein by reference. In addition, acetylenically unsaturated hydrocarbons having 3–20 carbon atoms per molecule as well as halo- and cyano-substituted olefinic materials can be converted to disproportionation products using our catalyst.

The olefin disproportionation conversion of the above-mentioned unsaturated materials is accomplished by contacting our catalyst system with the feed under suitable conditions to provide the desired unsaturated products. Suitable conditions for the reaction include a pressure of from about 0–5000 psig, a temperature of from about 400°–1000° F., and space velocities of from about 1 to about 300 WHSV based on disproportionation catalyst present in the combination catalyst. Although the activity of the catalyst is suitable within the broad ranges mentioned above, increased activity is generally found when the pressure is from about 100 to about 500 psig, the temperature range is from about 650°–850° F., and the WHSV is from about 15 to about 70. The particular temperature, pressure and flow rates utilized within these ranges is largely dependent on the properties of the feed material undergoing the disproportionation conversion.

One particular advantage of our catalyst system over those of the prior art is the ability of the system to convert branched olefins according to the olefin disproportionation reaction. Our catalyst exhibits remarkable activity in converting these types of feeds. Heretofore, it has been found that branched materials such as isobutene, methyl-butenes, methyl-pentenes and the like are more resistant to the olefin disproportionation conversion reaction than the corresponding non-branched isomer. However, our system increases the conversion of the branched materials to primary disproportionation products as well as increasing the conversion of unbranched feeds when our system is compared to a mixture of a double bond isomerization catalyst and disproportionation catalyst wherein the isomerization catalyst has not been treated with the base compound.

Any conventional contacting technique can be used for the olefin disproportionation reaction, and batchwise or continuous operation can be utilized. After the reaction period, the products of the reaction can be separated and/or isolated by suitable means, such as by fractionation, crystallization, adsorption and the like. Unconverted feed materials or products not in the desirable molecular weight ranges can be recycled to the reaction zone.

Our invention is further illustrated by the following example, which should not, however, be construed as limiting the scope of our invention as described above.

EXAMPLE

Four separate catalyst systems were prepared. Each system contained 1.8 grams of tungsten oxide on silica and 10.8 grams of magnesium oxide. Catalyst A consisted of a physical mixture of these components alone.

Catalyst B was prepared by first treating the 1.8 grams of $WO_3/SiO_2$ with an aqueous solution containing 0.009 gram of potassium hydroxide. The catalyst particles were placed in the KOH solution for 8 minutes, at which time the pH of the solution was neutral, indicating complete uptake of the KOH. The solution was then decanted from the catalyst particles and the catalyst was dried. The KOH-treated $WO_3/SiO_2$ was then admixed with MgO.

Catalyst C was prepared by placing 10.8 grams of magnesium oxide in an aqueous solution containing 0.108 gram of KOH. After a period of about 8 minutes, the aqueous solution was removed under reduced pressure using a rotary evaporator. The KOH-treated MgO was then admixed with the $WO_3/SiO_2$.

Catalyst D was prepared by treating the MgO in the same manner as Catalyst C. The $WO_3/SiO_2$ catalyst was then treated with KOH in the same manner as for Catalyst B. The KOH-treated MgO was then admixed with the KOH-treated $WO_3/SiO_2$ catalyst.

Each of the mixed catalysts was then charged to a heated continuousflow fixed-bed reactor. The reactor contents included inert alpha-alumina both above and below the mixed catalyst bed.

The mixed catalysts were activated for use in place in the reactor by passing air over the catalyst at a temperature of 1000° F. for 3 hours, followed by treatment with carbon monoxide for 15 minutes at 1,000° F. The catalyst bed was then allowed to cool to operating temperature in the CO atmosphere.

The feed in the four runs was a mixture of $C_4$ olefins as follows: isobutene, 29.03 weight percent; 1-butene, 8.82 weight percent; cis-2-butene, 31.00 weight percent; and trans-2-butene, 31.15 weight percent. The feed was purified by treatment with calcium hydride, then passed through a 13-X molecular sieve (previously activated at 300°–400° F. for 2 hours) and then percolated over MgO (20–60 mesh pellets previously activated at 1000° F. for 3 hours) at room temperature. The feed was then preheated prior to entry into the fixed-bed disproportionation reactor. In each of the four runs, the temperature was 750° F. and the pressure was 300 psig. Results are reported below in Table I.

Table I

| Run Numbers | 1 | 2 | 3 | 4 |
|---|---|---|---|---|
| Catalyst | MgO+ WO$_3$/SiO$_2$ (A) | MgO WO$_3$/SiO$_2$-KOH (B) | MgO-KOH WO$_3$/SiO$_2$ (C) | MgO-KOH WO$_3$/SiO$_2$-KOH (D) |
| WHSV | 52 | 47.8–31 | 50 | 48.9 |
| Conv. of Butenes, Wt.% | 66.1 | 67.6 | 81.9 | 81.2 |
| Product Analysis, Wt.% | | | | |
| Isobutene (a) | 10.22 | 9.21 | 4.07 | 5.06 |
| Linear butenes (a) | 23.72 | 23.15 | 14.00 | 13.78 |
| Linear hexenes (b) | 4.65 | 5.06 | 9.18 | 18.97 |
| Linear pentenes (c) | 11.49 | 9.93 | 16.73 | 12.12 |
| Isopentenes (d) | 15.97 | 18.97 | 19.45 | 17.87 |

(a) Unreacted feed material.

(b) The reaction: $2CH_3-CH_2-CH=CH_2 \rightarrow CH_3-CH_2-CH=CH-CH_2-CH_3 + C_2H_4$ (c) The reaction: $CH_3-CH=CH-CH_3 + CH_3-CH_2-CH=CH_2 \rightleftarrows CH_3-CH=CH-CH_2-CH_3 + C_3H_6$ (d) The reaction:
$$\begin{array}{c} CH_3 \\ CH_3 \end{array}\!\!\!>\!\!CH=CH_2 + CH_3-CH=CH-CH_3 \rightleftarrows \begin{array}{c} CH_3 \\ CH_3 \end{array}\!\!\!>\!\!CH=CH-CH_3 + C_3H_6$$

The above experiments show that base treatment of the MgO component of the mixed catalyst (Runs 3 and 4) substantially increases conversion of the feed material. Moreover, the increase in conversion is reflected by the amount of isobutene and butenes additionally lost in Runs 3 and 4, indicating that reactions involving the isobutene component of the feed are occurring more readily over the catalyst wherein the MgO has been treated with KOH.

Reasonable variation and modification of our invention will be apparent to those skilled in the art without departing from the spirit and scope thereof. For example, it may be desirable to pretreat the feed material with suitable purifying agents prior to contact with the catalyst of the invention.

What is claimed is:

1. A composition of matter consisting essentially of a mixture of a solid olefin disproportionation catalyst capable of converting butene-2 and ethylene to propylene and an MgO solid double bond isomerization catalyst capable of isomerizing butene-2 to butene-1 under the conditions at which the olefin disproportionation catalyst is capable of converting butene-2 and ethylene to propylene and wherein the double bond isomerization catalyst is contacted with calcium hydroxide, an alkali metal hydroxide, carbonate or halide prior to admixture with the solid olefin disproportionation catalyst.

2. The composition of claim 1 wherein the weight amount of double bond isomerization catalyst is in excess of the weight amount of the solid olefin disproportionation catalyst.

3. The composition of claim 2 wherein the weight amount of the double bond isomerization catalyst is 1.5 to 10 times the weight amount of the solid olefin disproportionation catalyst.

4. The composition of claim 1 wherein the solid olefin disproportionation catalyst comprises an oxide of molybdenum, tungsten, or rhenium on a support of alumina, silica, silica-alumina, or aluminum phosphate.

5. The composition of claim 4 wherein the MgO double bond isomerization catalyst is contacted with potassium hydroxide prior to admixture with the solid olefin disproportionation catalyst.

6. The composition of claim 4 wherein the solid olefin disproportionation catalyst is also treated with the metal hydroxide, carbonate, or halide prior to admixture with the double bond isomerization catalyst.

7. The composition of claim 1 wherein the composition is contacted with a stream of oxygen-containing gas at a temperature in the range of from 750° to 1,800° F. prior to contact with the feed olefin.

8. The composition of claim 1 which consists essentially of a mixture of tungsten oxide deposited on a support of silica and magnesium oxide wherein the weight amount of the magnesium oxide is 1.5 to 10 times the weight amount of the tungsten oxide on silica and the magnesium oxide is contacted with an aqueous solution of a treating agent selected from the group consisting of alkali metal hydroxides, carbonates, halides and calcium hydroxides prior to admixture with the tungsten oxide on silica to provide from about 0.007 to 3.5 g. metal equivalents per 100 g. of magnesium oxide after treatment and drying.

9. The composition of claim 8 wherein said treating agent is potassium hydroxide.

* * * * *